US 9,080,695 B2
Jul. 14, 2015

(12) United States Patent
Magno, Jr.

(10) Patent No.: US 9,080,695 B2
(45) Date of Patent: Jul. 14, 2015

(54) STRUT AND TRAPEZE SYSTEM

(71) Applicant: Thomas & Betts International, Inc., Wilmington, DE (US)

(72) Inventor: Joey D. Magno, Jr., Cordova, TN (US)

(73) Assignee: Thomas & Betts International, Inc., Wilmington, DE (US)

(*) Notice: Subject to any disclaimer, the term of this patent is extended or adjusted under 35 U.S.C. 154(b) by 0 days.

(21) Appl. No.: 13/765,847

(22) Filed: Feb. 13, 2013

(65) Prior Publication Data
US 2013/0248660 A1    Sep. 26, 2013

Related U.S. Application Data

(60) Provisional application No. 61/615,407, filed on Mar. 26, 2012.

(51) Int. Cl.
| E21F 17/02 | (2006.01) |
| F16L 3/00 | (2006.01) |
| F16L 3/133 | (2006.01) |
| F16L 3/227 | (2006.01) |
| A47H 1/10 | (2006.01) |

(52) U.S. Cl.
CPC ............ *F16L 3/133* (2013.01); *F16L 3/227* (2013.01); *F16L 3/00* (2013.01)

(58) Field of Classification Search
USPC ............ 248/317, 327, 340; 403/232.1, 233, 403/237, 241, 245, 246, 263, 49, 188
See application file for complete search history.

(56) References Cited

U.S. PATENT DOCUMENTS

| 618,603 | A | | 1/1899 | Henneman |
| 1,606,289 | A | * | 11/1926 | Bowers ........................ 248/327 |
| 2,735,157 | A | * | 2/1956 | Hotchkiss et al. ............... 27/12 |
| 2,936,988 | A | * | 5/1960 | Bodian ...................... 248/228.1 |
| 3,226,076 | A | * | 12/1965 | Spuhler ........................ 248/327 |
| 3,233,297 | A | | 2/1966 | Havener |
| 3,752,902 | A | | 8/1973 | Wilson |
| 3,854,684 | A | | 12/1974 | Moore |
| 3,918,234 | A | * | 11/1975 | Weissman ........................ 52/39 |
| 3,938,767 | A | | 2/1976 | Norris |
| 4,232,847 | A | | 11/1980 | Cooper |
| 4,426,822 | A | * | 1/1984 | Gailey ............................ 52/669 |
| 4,742,979 | A | | 5/1988 | Syversten et al. |
| 5,102,074 | A | | 4/1992 | Okada |
| 6,012,691 | A | | 1/2000 | van Leeuwen et al. |
| 6,748,705 | B2 | * | 6/2004 | Orszulak et al. ............. 52/167.1 |
| 6,807,791 | B2 | * | 10/2004 | Herb ............................... 52/846 |
| 7,651,056 | B2 | | 1/2010 | Tjerrild |
| 7,661,915 | B2 | | 2/2010 | Whipple |
| 7,926,766 | B2 | | 4/2011 | Tjerrild |
| 7,931,242 | B2 | | 4/2011 | Tjerrild |
| 7,946,540 | B2 | | 5/2011 | Drane et al. |
| 2009/0090820 | A1 | | 4/2009 | Tjerrild |
| 2010/0084519 | A1 | | 4/2010 | Tjerrild |
| 2011/0163208 | A1 | | 7/2011 | Tjerrild |

FOREIGN PATENT DOCUMENTS

| CA | 2121373 | 4/1993 |
| CA | 2182172 | 8/1995 |
| CA | 2385956 | 4/2001 |

* cited by examiner

*Primary Examiner* — Jonathan Liu
*Assistant Examiner* — Taylor Morris
(74) *Attorney, Agent, or Firm* — Snyder, Clark, Lesch & Chung, LLP

(57) ABSTRACT

An assembly comprising a strut comprising mounting holes to affix one or more attachments and one or more fixtures to the strut, and support holes shaped to receive and couple beaded rods with the strut for suspension of the strut, wherein the strut is coupled to the beaded rods without a threaded coupling.

18 Claims, 26 Drawing Sheets

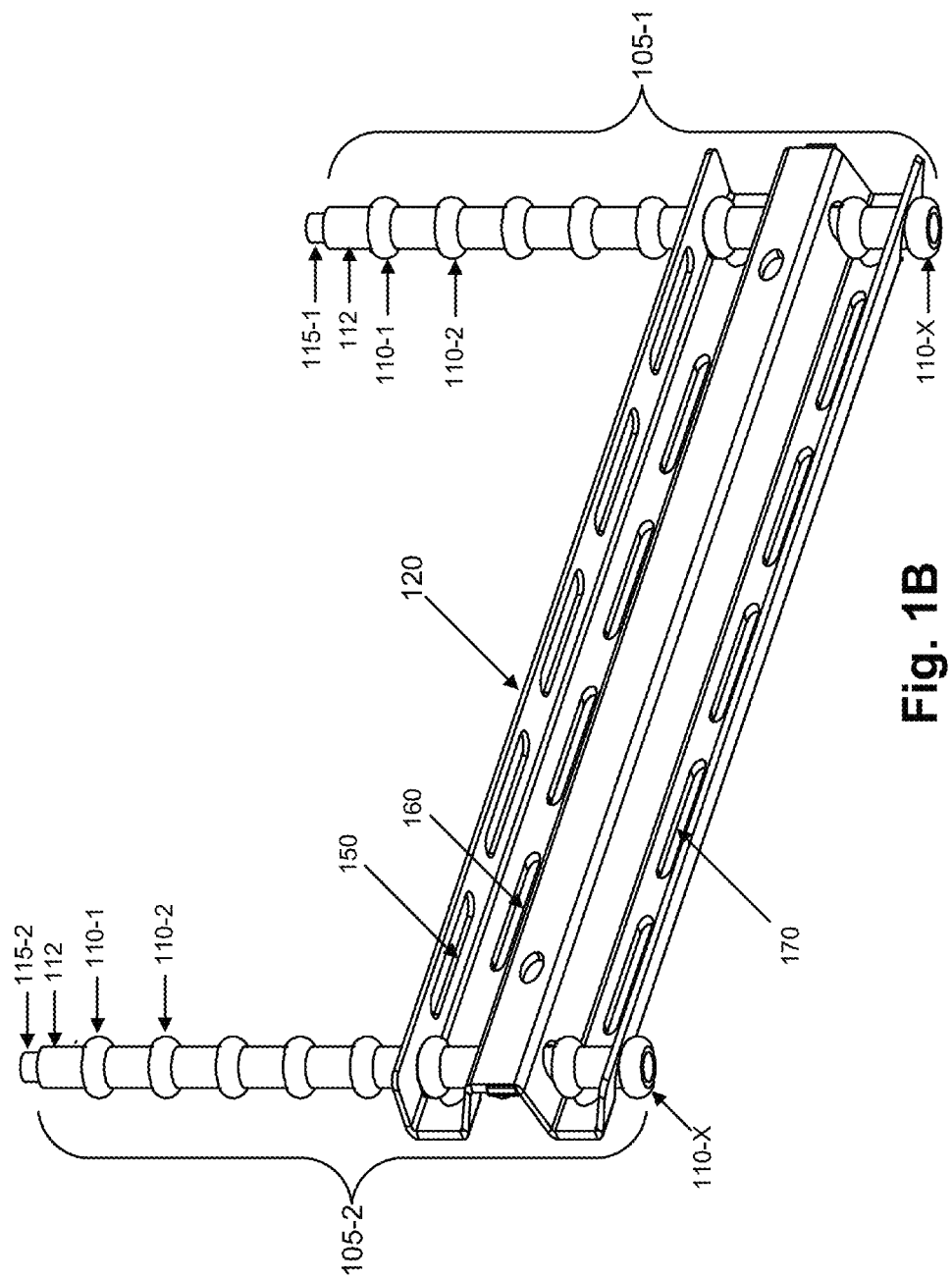

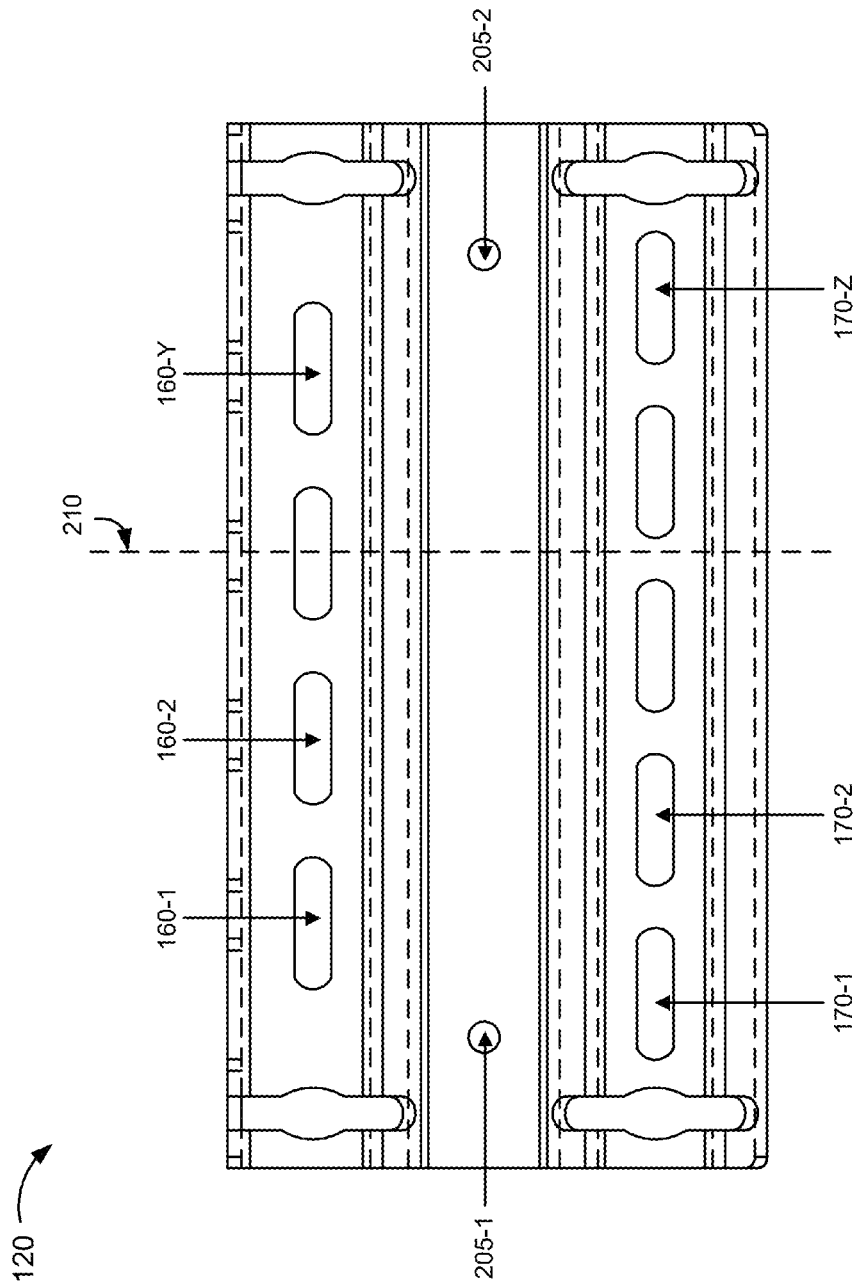

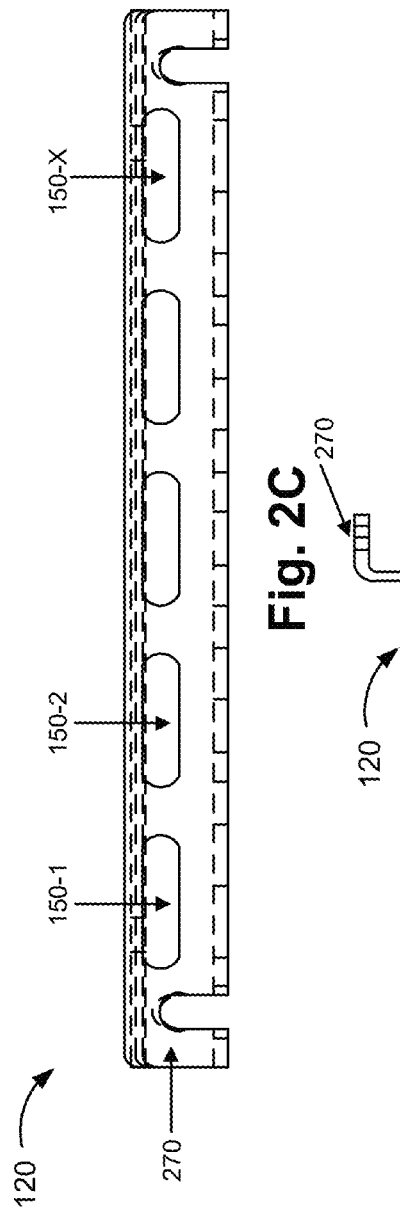
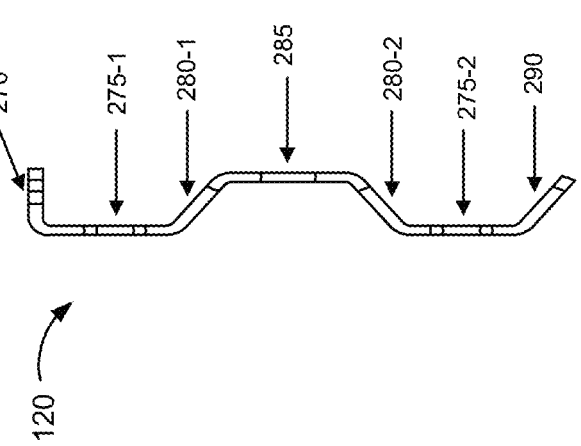
Fig. 2C
Fig. 2B

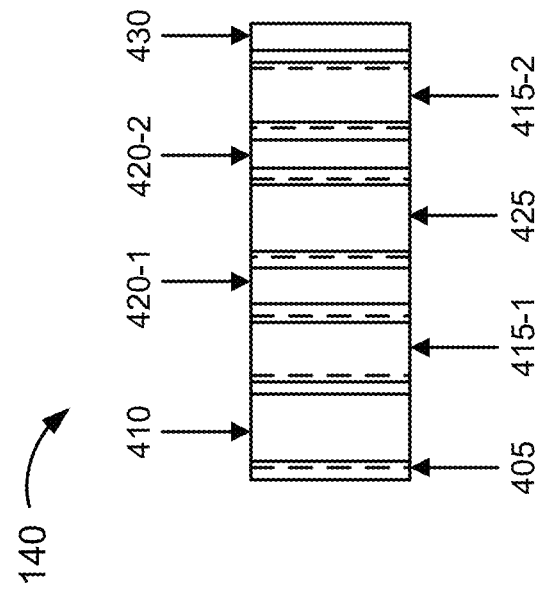
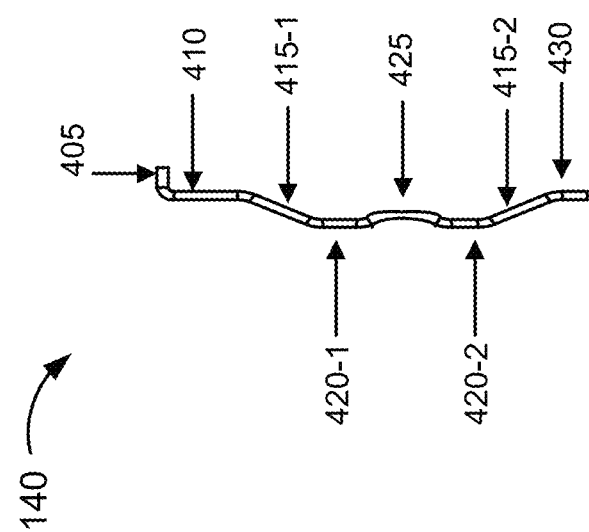
Fig. 4C
Fig. 4B

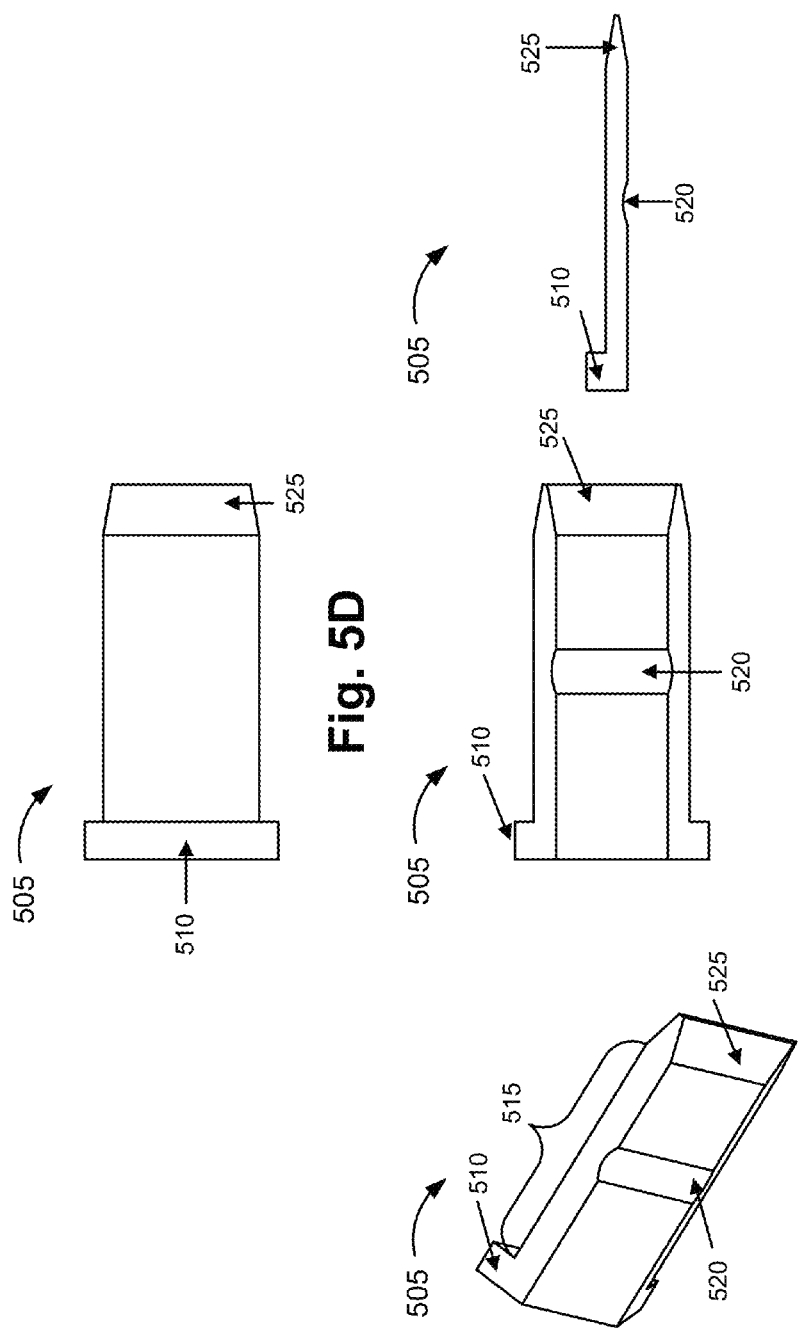

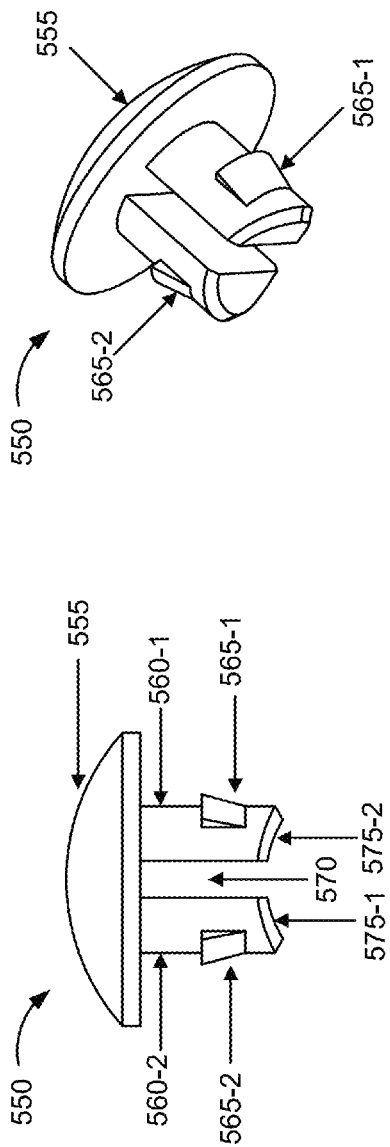
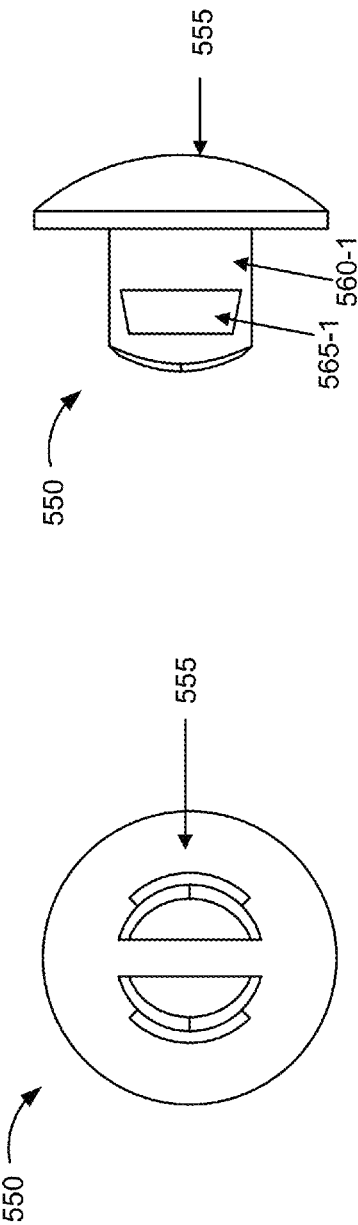

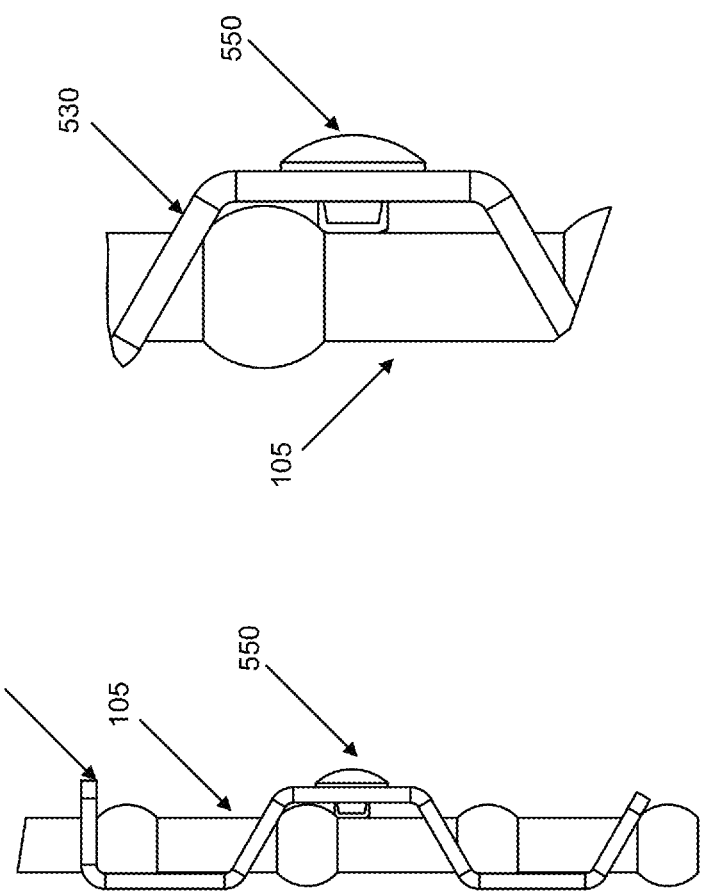

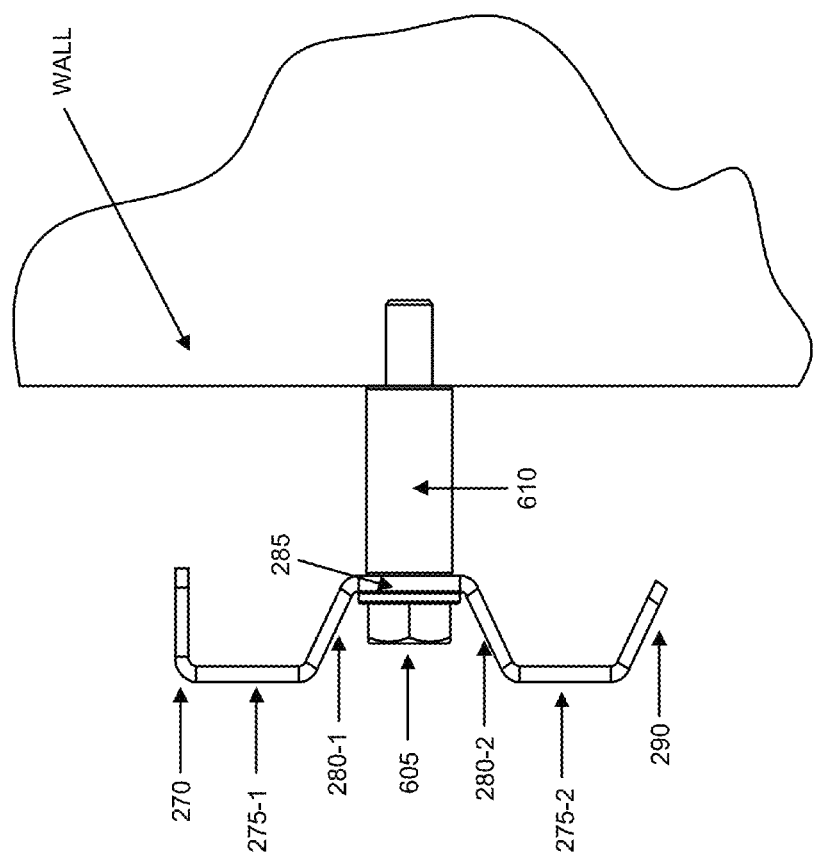

STRUT AND TRAPEZE SYSTEM

CROSS-REFERENCE TO RELATED APPLICATION

This application claims priority under 35 U.S.C. §119, based on U. S. Provisional Patent Application No. 61/615,407, filed Mar. 26, 2012, the disclosure of which is hereby incorporated by reference herein.

BACKGROUND

Mounting systems can be used in a variety of industries, such as food processing and pharmaceutical venues. Wall-mounting systems and trapeze mounting systems are typically used to mount pipes, conduits, and tubes. These mounting systems are inherently difficult to clean, inspect, and by design are susceptible to accumulating various contaminants including dirt, insects, etc.

BRIEF DESCRIPTION OF THE DRAWINGS

FIGS. 1A and 1B are diagrams illustrating isometric views of an exemplary embodiment of a mounting assembly;

FIG. 2A is a diagram illustrating a flattened view of an exemplary embodiment of a strut;

FIG. 2B is a diagram illustrating an end view of the strut;

FIG. 2C is a diagram illustrating a top view of the strut;

FIGS. 4B-4F are diagrams illustrating views of an exemplary embodiment of a locking tab;

FIGS. 5A-5D are diagrams illustrating views of another exemplary embodiment of a locking tab;

FIG. 5F-5I are diagrams illustrating views of yet another exemplary embodiment of a locking tab;

FIGS. 5J and 5K are diagrams illustrating side views of the mounting assembly depicted in FIG. 5E;

FIGS. 6A-6C are diagrams illustrating views of a use case of the strut;

DETAILED DESCRIPTION OF PREFERRED EMBODIMENTS

The following detailed description refers to the accompanying drawings. The same reference numbers in different drawings may identify the same or similar elements.

Figure 1A:
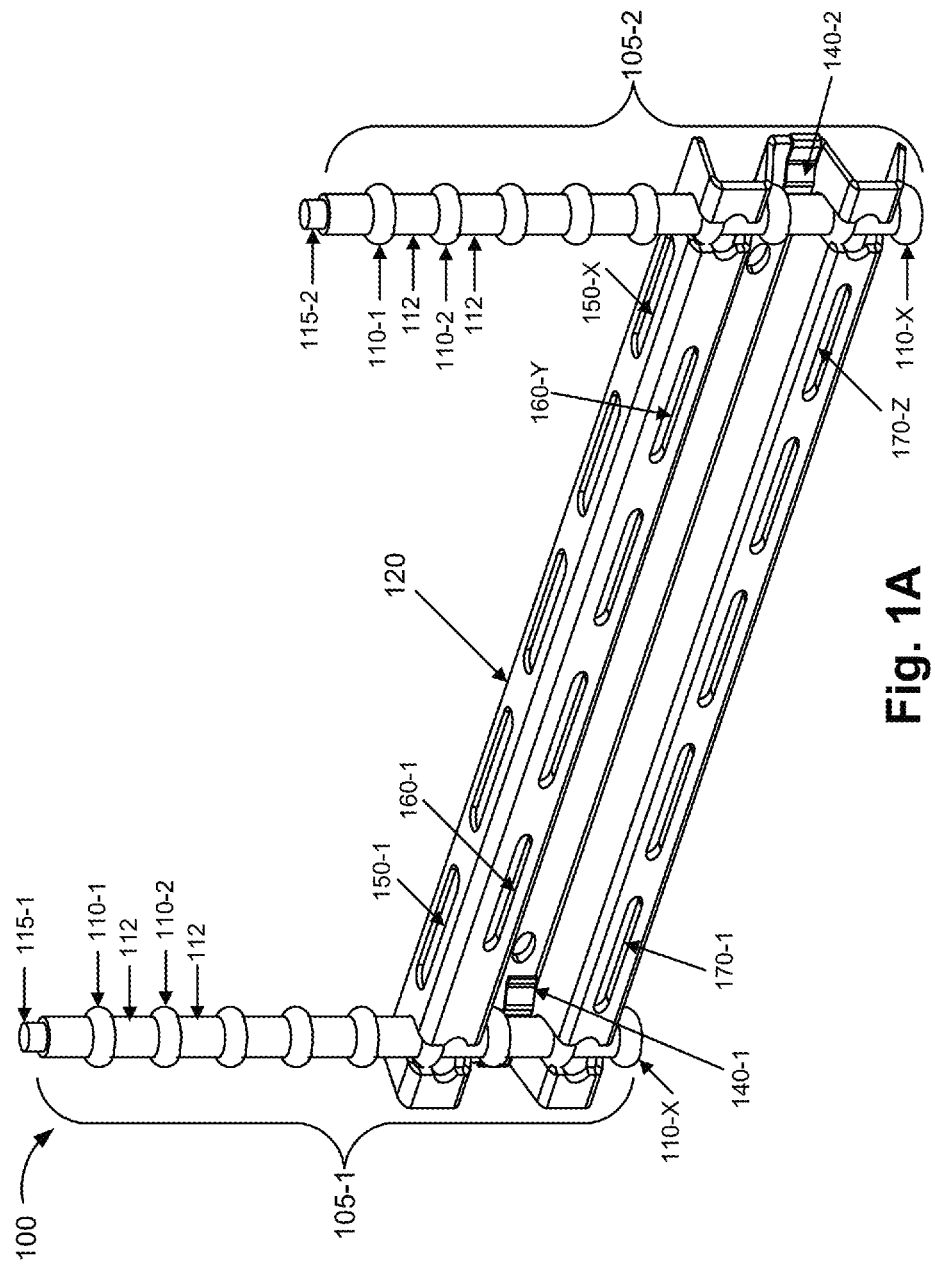

FIG. 1A is a diagram illustrating an isometric view of an exemplary embodiment of an assembly 100. As illustrated, assembly 100 includes beaded rods 105-1 and 105-2 (also referred to collectively as beaded rods 105 and individually as beaded rod 105), a strut 120, and locking tabs 140-1 and 140-2 (also referred to collectively as locking tabs 140 and individually as locking tab 140).

As illustrated, each of beaded rods 105 includes beads 110-1 through 110-X, in which X>1 (also referred to collectively as beads 110 or individually as bead 110) and a rod 112. Beaded rod 105-1 includes a threaded portion 115-1 and beaded rod 105-2 includes a threaded portion 115-2 (also referred to as threaded portions 115 and threaded portion 115). According to an exemplary embodiment, bead 110-X includes threading to allow the assembly of a series of beaded-rods 105. For example, threaded portion 115-2 may be threaded into a threading of bead 110-X. Beaded-rod 105 may be made from various materials, such as, for example, metal (e.g., stainless steel, aluminum, etc.) or a non-metallic material (e.g., plastic, a composite, etc.), depending on the load and/or application (e.g., food-grade, pharmaceutical, etc.) of assembly 100.

Strut 120 includes holes to receive beaded-rods 105 and holes to allow strut 120 to be secured to a surface (e.g., a wall, etc.), as described further below. Additionally, strut 120 includes holes to receive an attachment (e.g., a U-bolt, a bracket, a clamp, etc.) to secure a fixture (e.g., a pipe, a tube, a conduit, a channel, etc.) to strut 120. For example, according to an exemplary embodiment, strut 120 includes mounting holes 160-1 through 160-Y, in which Y>1 (also referred to collectively as mounting holes 160 and individually as mounting hole 160), and mounting holes 170-1 through 170-Z, in which Z>1 (also referred to collectively as mounting holes 170 and individually as mounting hole 170). Strut 120 also includes mounting holes 150-1 through 150-X, in which X>1 (also referred to collectively as mounting holes 150 and individually as mounting hole 150). Strut 120 may be made from a material similar to a material of beaded-rod 105. Locking tab 140 includes a flexible member to assist in securing beaded rods 105 with strut 120.

FIG. 1B is a diagram illustrating another isometric view showing a reverse side of assembly 100. Assembly 100 is a trapeze-type assembly in which beaded rods 105 suspend strut 120. A wall-mount type assembly is also disclosed in this description. The elements of assembly 100 are described further below.

FIG. 2A is a flattened view of strut 120. As illustrated, strut 120 includes mounting holes 160 and mounting holes 170. Strut 120 also includes holes 205-1 and 205-2 (also referred to collectively as holes 205 and individually as hole 205).

Mounting hole 160 and mounting hole 170 each includes a hole to receive an attachment or a portion of an attachment to secure a fixture to strut 120. According to an exemplary embodiment, mounting hole 160 and mounting hole 170 each has an elongated shape. Mounting holes 160 and mounting holes 170 may be equally spaced. Additionally, according to an exemplary embodiment, as illustrated in reference to imaginary line 210, mounting holes 160 are offset from mounting holes 170. In this way, mounting holes 160 and mounting holes 170 provide a continuous mounting hole access along the length of strut 120. According to some use cases, the continuous mounting hole access may permit a user to mount attachments (e.g., U-bolts, brackets, clamps, etc.) and fixtures (e.g., pipes, tubes, conduits, etc.) with greater flexibility (e.g., closer together, etc.).

Hole 205 includes a hole to receive a fastener (e.g., a bolt, a screw, a nail, etc.). As described further below, according to a wall-mount embodiment, strut 120 may be secured using fasteners and holes 205.

FIG. 2B is a diagram illustrating an end view of strut 120. As illustrated, strut 120 includes a top wall 270, back walls 275-1 and 275-2 (also referred to collectively as back walls 275 and individually as back wall 275), sloped walls 280-1 and 280-2 (also referred to collectively as sloped walls 280 and individually as sloped wall 280), an intermediate wall 285, and a bottom wall 290.

As illustrated, according to an exemplary embodiment, back walls 275-1 and 275-2 extend substantially perpendicular to top wall 270. Additionally, intermediate wall 285 extends substantially perpendicular to top wall 270 and parallel to back walls 275. Sloped wall 280-1 extends between back wall 275-1 and intermediate wall 285, and sloped wall 280-2 extends between intermediate wall 285 and back wall 275-2. According to an exemplary embodiment, sloped walls 280 are sloped approximately thirty-degrees relative to back walls 275. According to another exemplary embodiment, the slopes of sloped walls 280 may be different (e.g., less than or greater than thirty degrees). For example, the slopes may be between twenty degrees and sixty degrees. As further illustrated, according to an exemplary embodiment, bottom wall 290 is sloped approximately thirty-degrees relative to back walls 275. According to another exemplary embodiment, the slope of bottom wall 290 may be different (e.g., less than or greater than thirty degrees). For example, the slopes may be between twenty degrees and sixty degrees. In contrast to well-known strut designs, bottom wall 290 does not include a lip portion. In this way, the shape of strut 120 facilitates the run-off of water, etc, during cleaning and minimizes the collection of contaminants.

FIG. 2C is a diagram illustrating a top view of strut 120. As illustrated, top wall 270 includes mounting holes 150. According to an exemplary embodiment, mounting hole 150 has a shape substantially similar to mounting hole 160 and mounting hole 170.

Figure 3A:
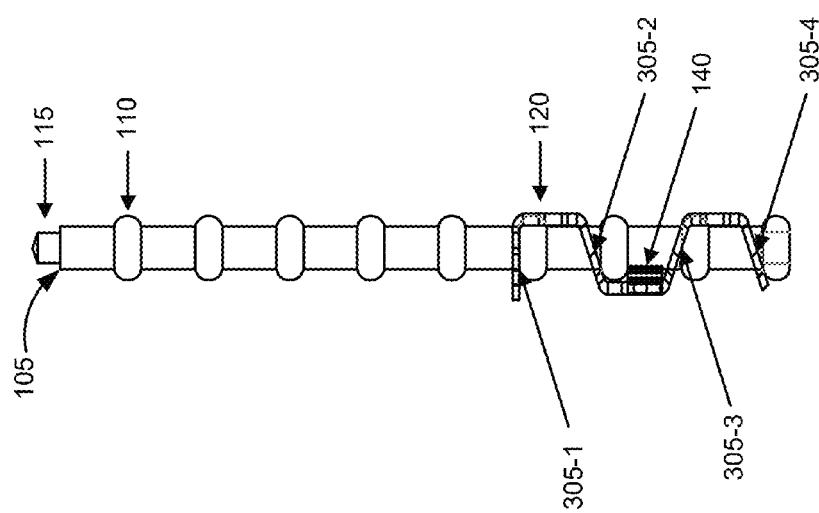
FIG. 3A is a diagram illustrating a side view of the mounting assembly.

FIG. 3A is a diagram illustrating a side view of strut 120 and beaded-rod 105. Beaded-rod 105 suspends strut 120 based on areas of contact 305-1 through 305-4 (also referred to collectively as area of contacts 305 and individually as area of contact 305). As illustrated, each area of contact 305 includes portions of strut 120 in contact with bead 110 of beaded-rod 105. The weight of strut 120 assists in stabilizing strut 120 on beaded rod 105. As previously described, the coupling of beaded rod 105 with strut 120 is accomplished without a threaded connection.

Figure 3B:
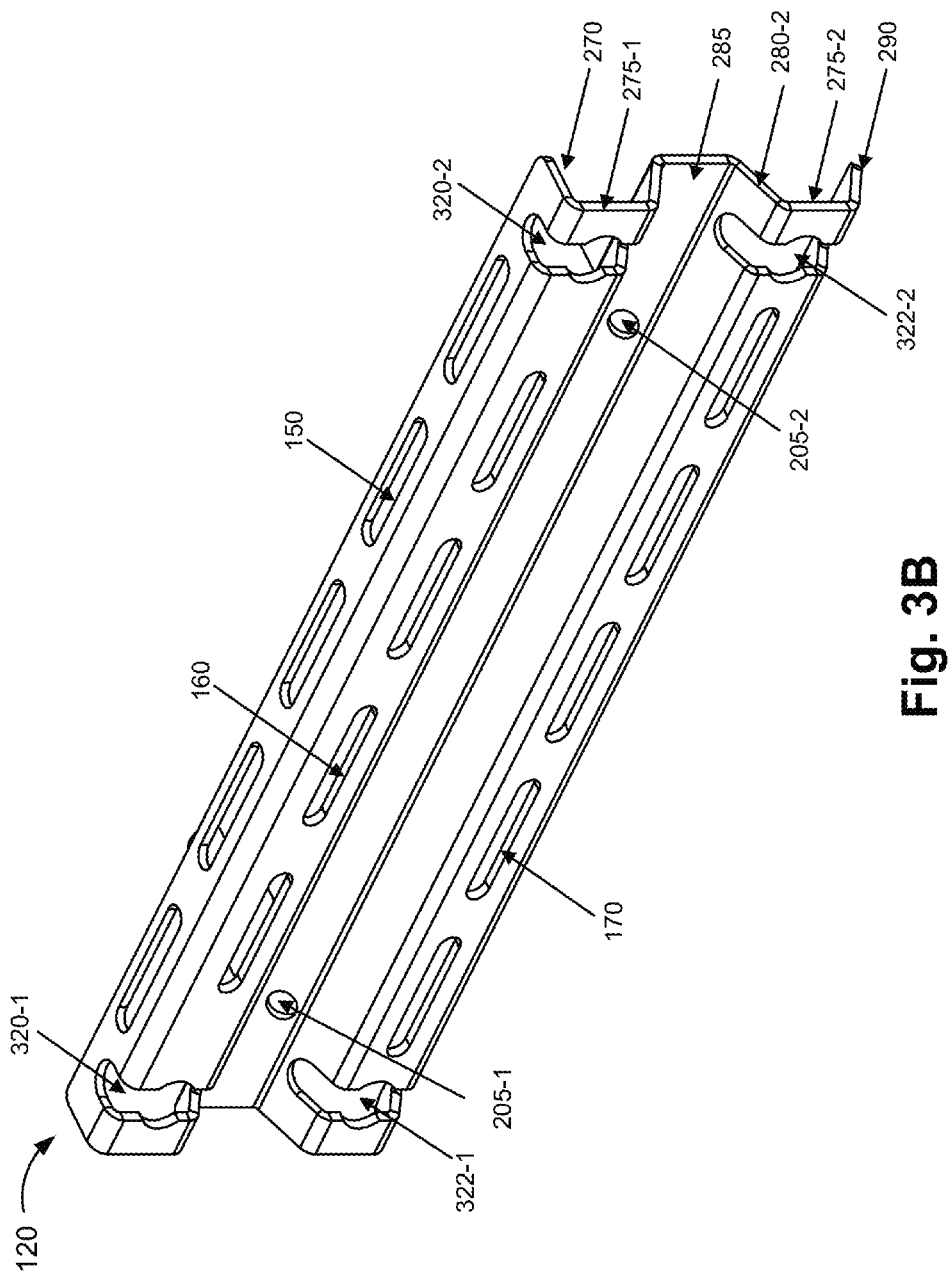
FIGS. 3B and 3C are diagrams illustrating isometric views of the strut.
Figure 3C:
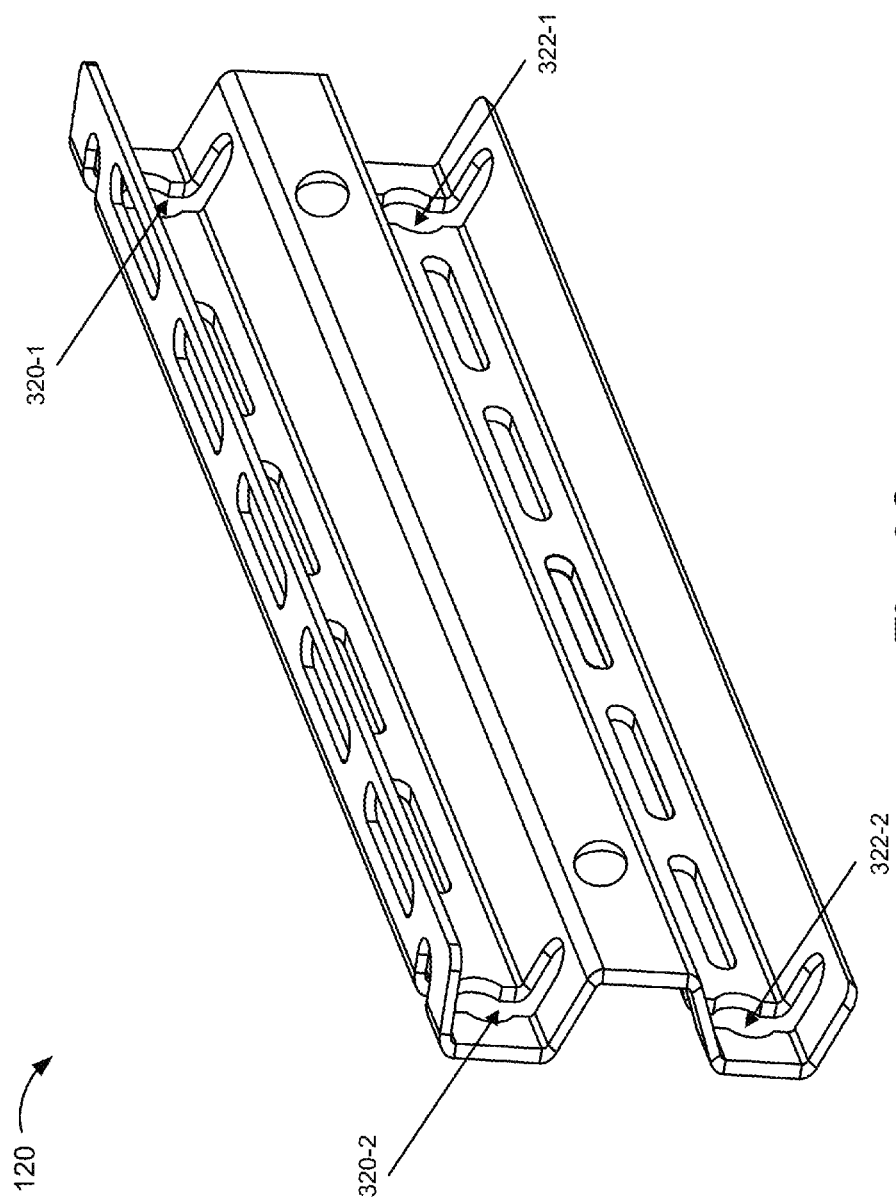
Figure 3D:
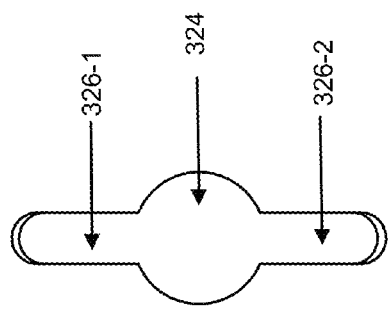
FIG. 3D is a diagram illustrating a beaded-rod hole.

FIGS. 3B and 3C are diagrams illustrating isometric view of strut 120. As illustrated, strut 120 includes beaded-rod holes 320-1 and 320-2 (also referred to collectively as beaded-rod holes 320 and individually as beaded-rod hole 320) and beaded-rod holes 322-1 and 322-2 (also referred to collectively as beaded-rod holes 322 and individually as beaded-rod hole 322). Beaded-rod hole 320 and beaded-rod hole 322 each includes a hole that is shaped to receive beaded-rod 105 and couple beaded-rod 105 with strut 120. FIG. 3D is a diagram illustrating a flattened view of beaded-rod hole 320/322. As illustrated, beaded-rod hole 320/322 includes a bead hole portion 324 that is shaped to receive bead 110 of beaded-rod 105 and rod hole portions 326-1 and 326-2 that are shaped to receive rod 112 of beaded-rod 105. Referring back to FIG. 3B, beaded-rod hole 320 extends from top wall 270 to back wall 275-1 to sloped wall 280-1, and beaded-rod hole 322 extends from sloped wall 280-2 to back wall 275-2 to bottom wall 290.

Figure 3E:
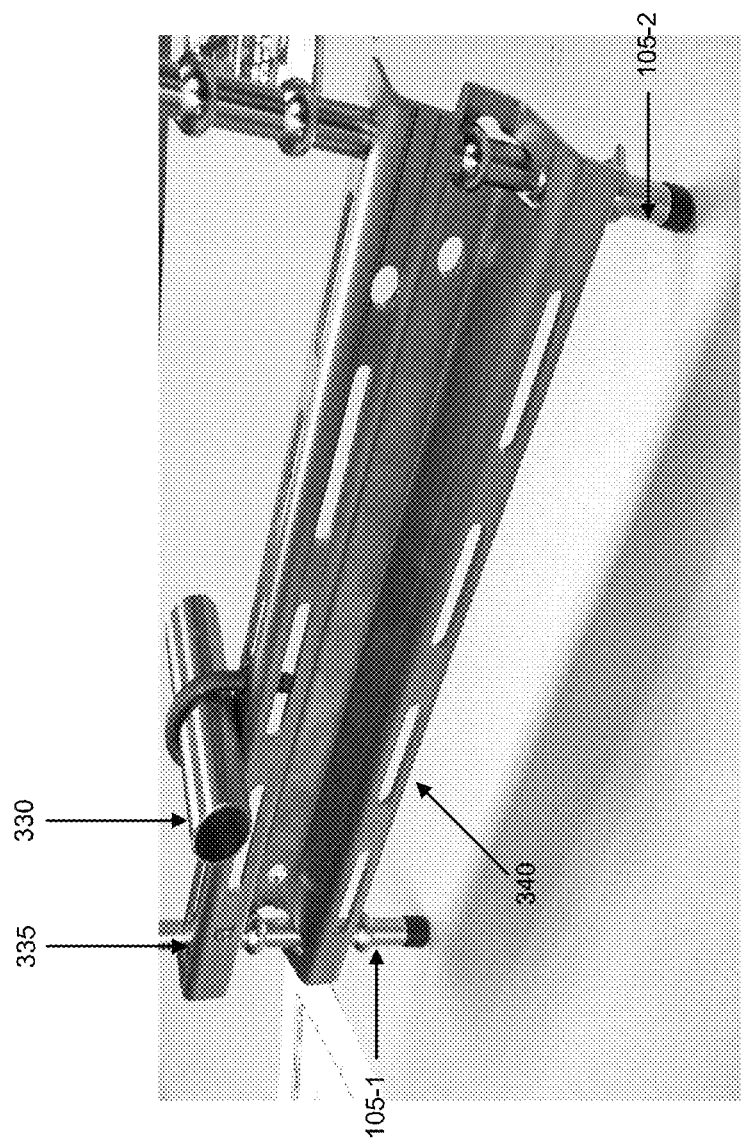
FIG. 3E is a diagram illustrating a use case of the mounting assembly.

FIG. 3E is a diagram illustrating strut 340 and beaded-rods 105. As illustrated, an attachment 330 (e.g., a U-bolt) is attached to strut 120 using mounting holes 150 to secure a fixture 335 (e.g., a pipe). Strut 340 is similar to strut 705, as described further below, in terms of, for example, including rod recesses and the walls defining a beaded-rod hole.

Figure 4A:
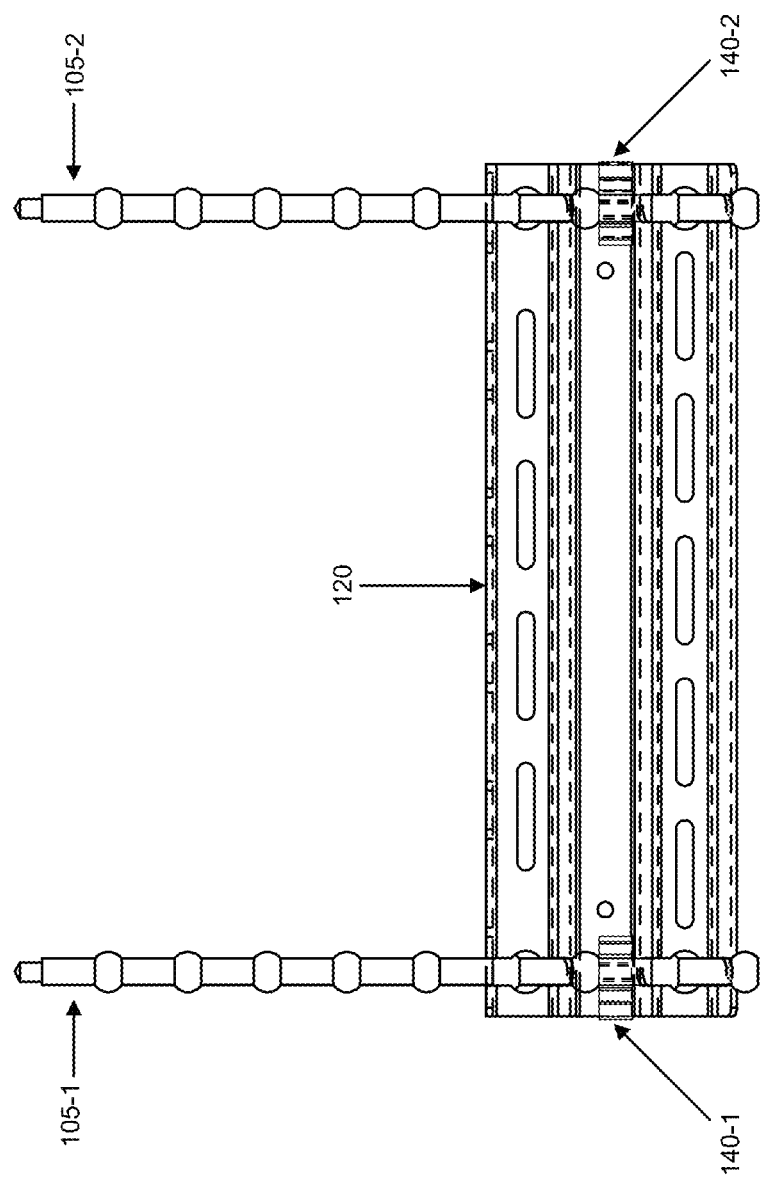
FIG. 4A is a diagram illustrating a view of the mounting assembly.

FIG. 4A is a diagram illustrating a planar view of strut 120 and locking tabs 140. As previously described, locking tabs 140 assist in securing beaded rods 105 with strut 120. FIG. 4B is a diagram illustrating an end view of locking tab 140. As illustrated, locking tab 140 includes a lip portion 405, a portion 410, portions 415-1 and 415-2 (also referred to collectively as portions 415 and individually as portion 415), portions 420-1 and 420-2 (also referred to collectively as portions 420 and individually as portion 420), an intermediate portion 425, and an end portion 430.

Figure 4F:
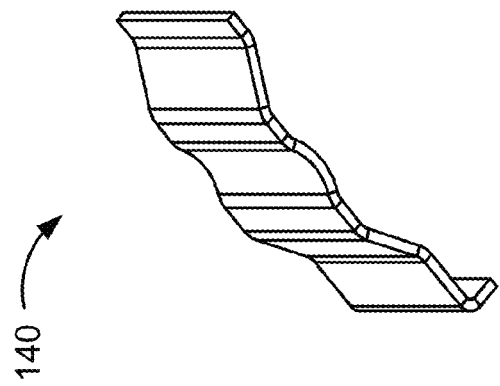
Figure 4E:
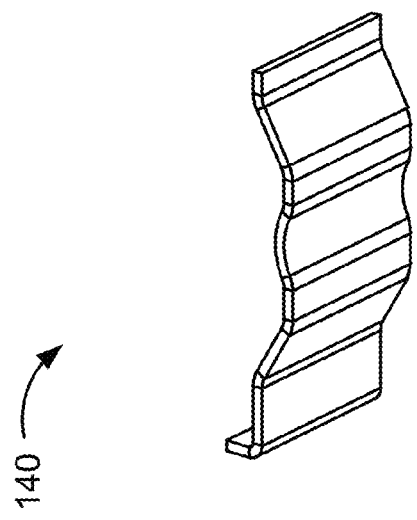
Figure 4D:
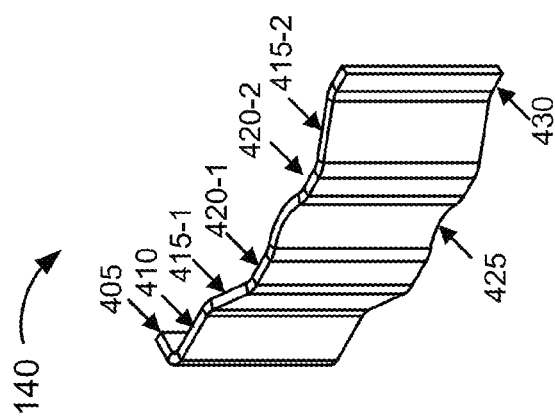

Referring to FIG. 4B, portion 410 extends substantially perpendicular from lip portion 405. Also, portion 415-1 and portion 420-1 extend from intermediate portion 425 and portion 415-2 and portion 420-2 extend from intermediate portion 425 in a symmetric manner. Additionally, portion 410 and end portion 430 extend within a same, imaginary plane. According to an exemplary embodiment, intermediate portion 425 is shaped to receive a portion of rod 112 of beaded-rod 105. For example, intermediate portion 425 may extend in a slightly curved manner. FIG. 4C is a diagram illustrating a planar view of locking tab 140. FIGS. 4D through 4F are diagrams illustrating isometric views of locking tab 140. As illustrated, locking tab 140 extends in an undulating manner from portion 410 to end portion 430.

Referring back to FIG. 1A and FIG. 1B, lip portion 405 is placed at an end side of strut 120 and the remaining portions of locking tab 140 extend along another side of strut 120. Locking tab 140 assists in maintaining the position of strut 120 in relation to beaded-rod 105. For example, an edge of locking tab may have contact with an underside of bead 110 and an opposite edge of locking tab 140 may have contact with sloped wall 280-2. Additionally, intermediate portion 425 may have contact with rod portion 112 of beaded-rod 105. Locking tab 140 may provide a spring-like urging based on the material of locking tab 140 and contacts areas of strut 120 and beaded-rod 105.

FIGS. 5A-5D are diagrams illustrating another exemplary embodiment of a locking tab. Referring to FIG. 5A, a locking tab 505 includes a lip portion 510 a main body portion 515 that includes a rod portion 520, and an end portion 525. As illustrated main body portion 515 extends substantially perpendicular from lip portion 510. Rod portion 520 is contoured to receive rod 112 of beaded-rod 105. End portion 525 is wedge-shaped. The shape of end portion 525 may assist a user in inserting locking tab 505 between strut 120 and beaded-rod 105. Locking tab 505 may be used in a manner similar to that illustrated in FIGS. 1A and 1B, in which lip portion 510 is placed at an end side of strut 120 and main body 515 and end portion 525 extend along another side of strut 120.

Figure 5E:
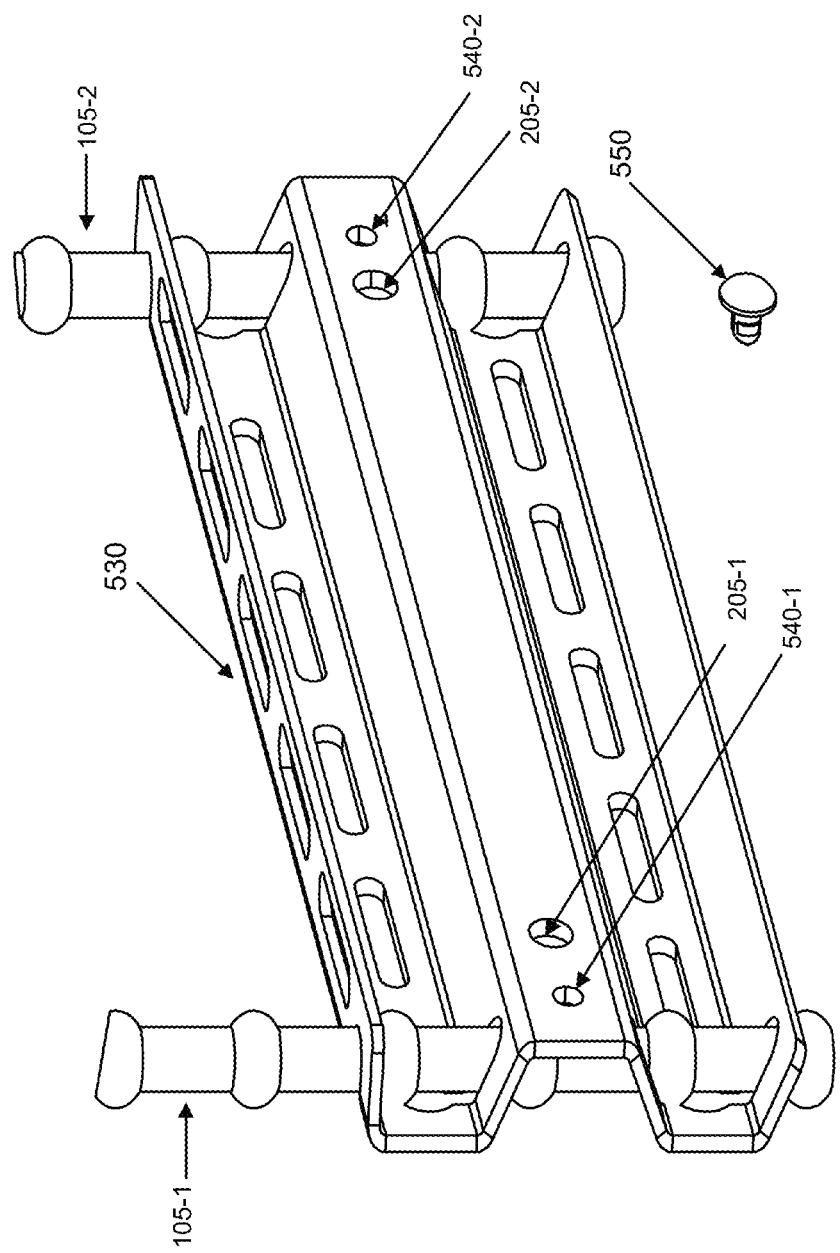
FIG. 5E is a diagram illustrating an isometric view of another exemplary embodiment a mounting assembly.

FIG. 5E is a diagram illustrating an isometric view of another exemplary embodiment of a mounting assembly. As illustrated, a strut 530 includes a structure similar to strut 120. However, strut 530 includes tab holes 540-1 and 540-2 (also referred to collectively as tab holes 540 and individually as tab hole 540) that are proximate to holes 205, which receive a fastener (e.g., for wall-mounting). Tab holes 540 are shaped to receive a locking tab 550.

FIG. 5F-5I are diagrams illustrating views of yet another exemplary embodiment of a locking tab 550. Referring to FIG. 5F, locking tab 550 includes a head portion 555, stems 560-1 and 560-2 (also referred to collectively as stems 560 and individually as stem 560), tabs 565-1 and 565-2 (also referred to collectively as tabs 565 and individually as tab 565), a gap 570, and rod portions 575-1 and 575-2 (also referred to collectively as rod portions 575 and rod portion 575). Locking tab 550 may be made from materials similar to those described for strut 120.

Head portion 555 includes a dome-shaped portion. Stems 560 extend from head portion 555 in a substantially perpendicular manner. Stem 560 has a semi-circular column or rod shape. Tabs 565 may be flexible and provide a frictional engagement when inserted into tab holes 540. Tabs 565 flare outwardly in relation to stems 560. Gap 570 provides a space between stems 560. Rod portions 575 are curved shaped so as to make contact with rod portion 112 of beaded-rod 105.

FIGS. 5J and 5K are diagrams illustrating side views of the mounting assembly depicted in FIG. 5E. When locking tab 550 has been inserted into tab hole 540, head portion 555 has a diameter that hides tab hole 540 when head portion 555 rests against an intermediate wall of strut 530. During insertion, stem 560 may move inward within gap 570 as locking tab 550 is inserted into tab hole 540, and tabs 565 contact the perimeter wall defining tab hole 540. Stems 560 may move back to their original position once locking tab 550 is completely inserted. Tabs 565 may provide a locking effect and rod portions 575 may come in contact with rod portion 112 of beaded-rod 105 or be situated substantially close to rod portion 112 of beaded-rod 105.

Figure 6A:
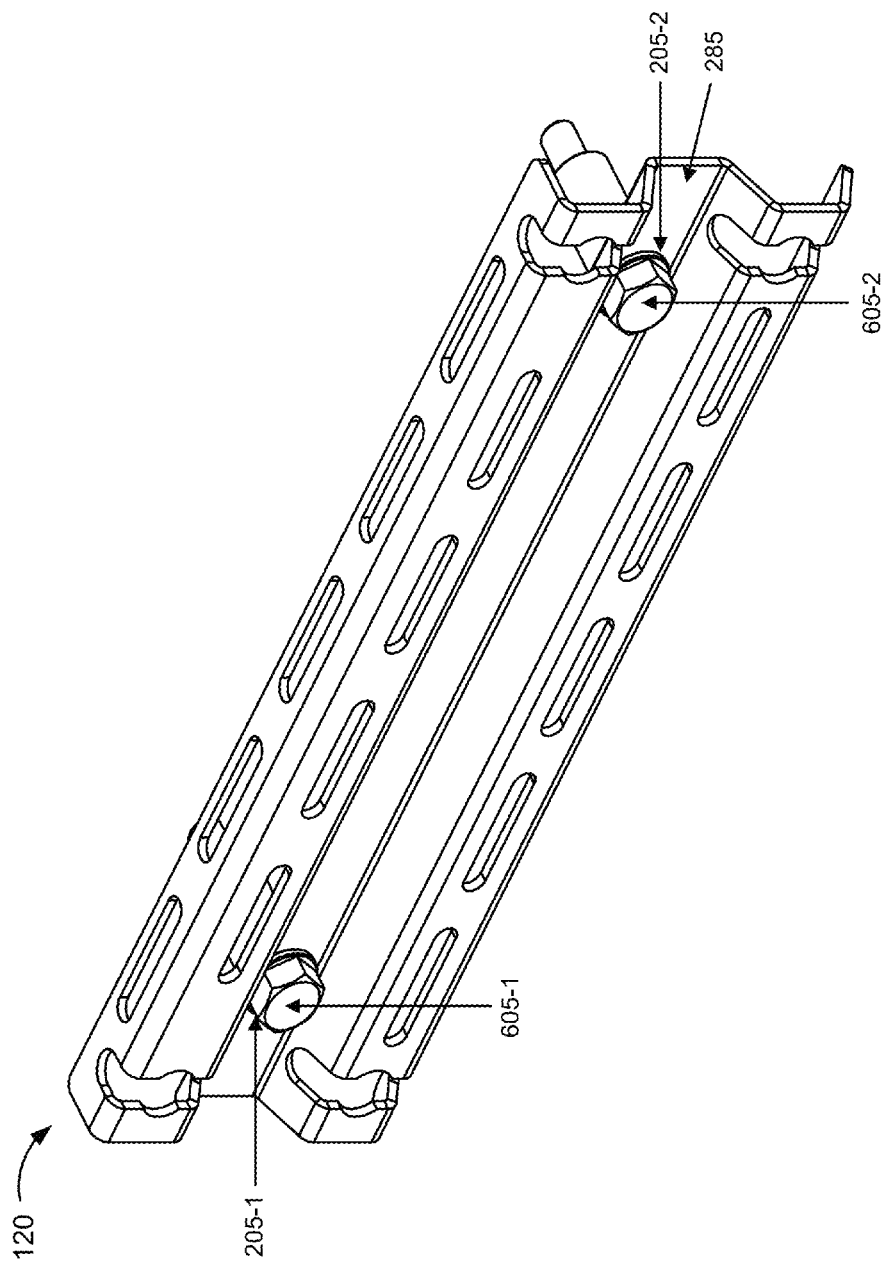
Figure 6B:
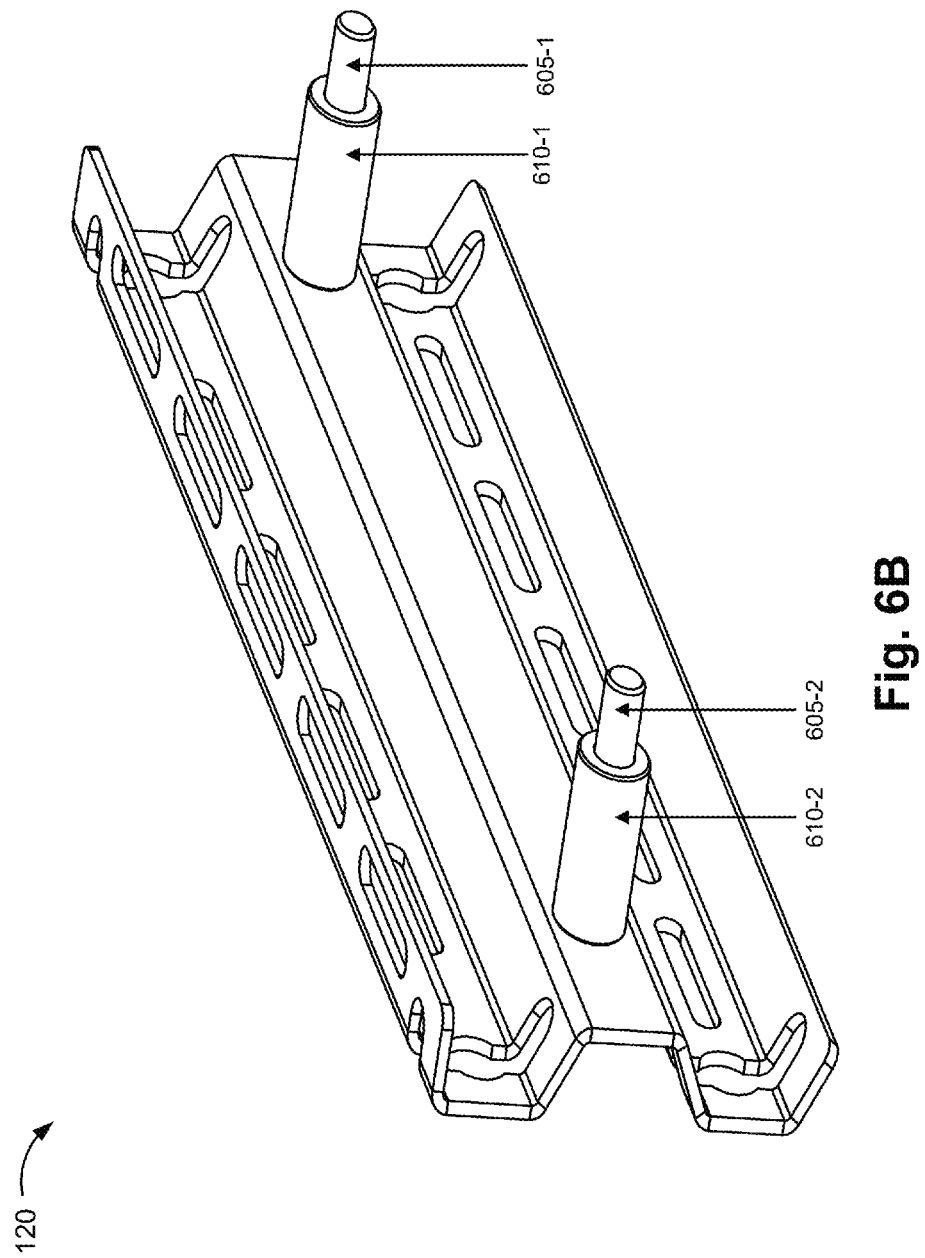

FIGS. 6A-6B are diagrams illustrating an isometric view of strut 120. In contrast to FIGS. 1A and 1B, in which strut 120 is illustrated according to a trapeze-mount use case, FIGS. 6A and 6B illustrate strut 120 according to a wall-mount use case. Referring to FIG. 6A, fasteners 605-1 and 605-2 are inserted in holes 205. Referring to FIG. 6B, stand-offs 610-1 and 610-2 may be used to provide space between strut 120 and a wall-mountable surface. FIG. 6C is a diagram illustrating an end view of a wall-mount use case of strut 120.

Figure 7A:
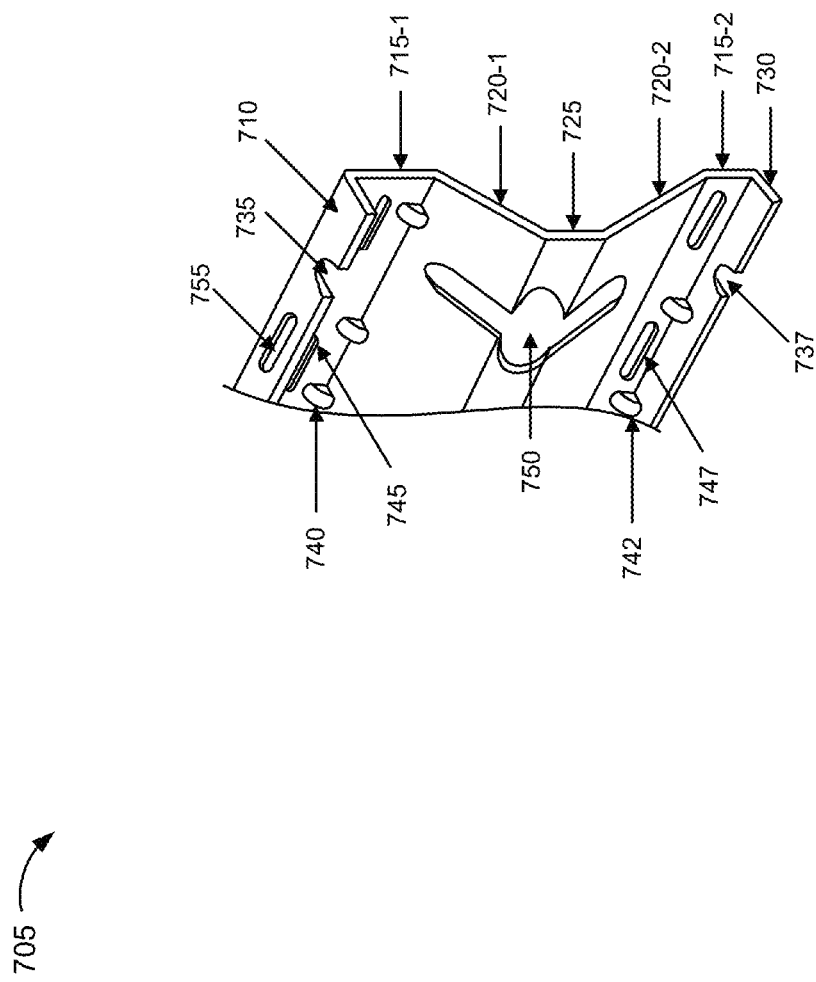
FIGS. 7A-7D are diagrams illustrating views of another exemplary embodiment of a mounting assembly.

FIG. 7A is a diagram illustrating an isometric view of another exemplary embodiment of a strut. As illustrated, a portion of a strut 705 includes a top wall 710, back walls 715-1 and 715-2 (also referred to collectively as back walls 715 and individually as back wall 715), sloped walls 720-1 and 720-2 (also referred to collectively as sloped walls 720 and individually as sloped wall 720), an intermediate wall 725, and a bottom wall 730. Strut 705 may be made from a material previously described for strut 120.

As illustrated, according to an exemplary embodiment, back walls 715 extend substantially perpendicular to top wall 710. Additionally, intermediate wall 725 extends substantially perpendicular to top wall 710 and parallel to back walls 275. According to an exemplary embodiment, sloped walls 720 are sloped approximately thirty-degrees relative to back walls 275. According to another embodiment, the slopes of sloped walls 720 may be different (e.g., less than or greater than thirty degrees). According to an exemplary embodiment, bottom wall 730 is sloped approximately thirty-degrees relative to back walls 275. According to another embodiment, the slope of bottom wall 730 may different (e.g., (e.g., less than or greater than thirty degrees).

Strut 705 includes a rod recess 735 situated on top wall 710 and a rod recess 737 situated on bottom wall 730. As illustrated, rod recess 735 and rod recess 737 is each shaped to receive rod 112 of beaded-rod 105. Strut 705 includes ribs 740 proximate to mounting holes 745 and ribs 742 proximate to mounting holes 747. Ribs 740 and ribs 742 provide added support to strut 705. Similar to mounting holes 160 and 170, mounting holes 745 and mounting holes 747 include holes to receive an attachment or a portion of an attachment that may be used to secure a fixture. Additionally, similar to mounting holes 160 and 170, mounting holes 745 are offset from mounting holes 747.

Strut 705 also includes a beaded-rod hole 750. Since FIG. 7A illustrates a portion of strut 705, strut 705 includes two beaded-rod holes 750, each proximate to an end of strut 705. In contrast to strut 120, strut 705 includes a single beaded-rod hole 750 proximate to the end of strut 705. Additionally, as illustrated in FIG. 7A, beaded-rod hole 750 is formed by sloped walls 720 and intermediate wall 725.

Figure 7B:
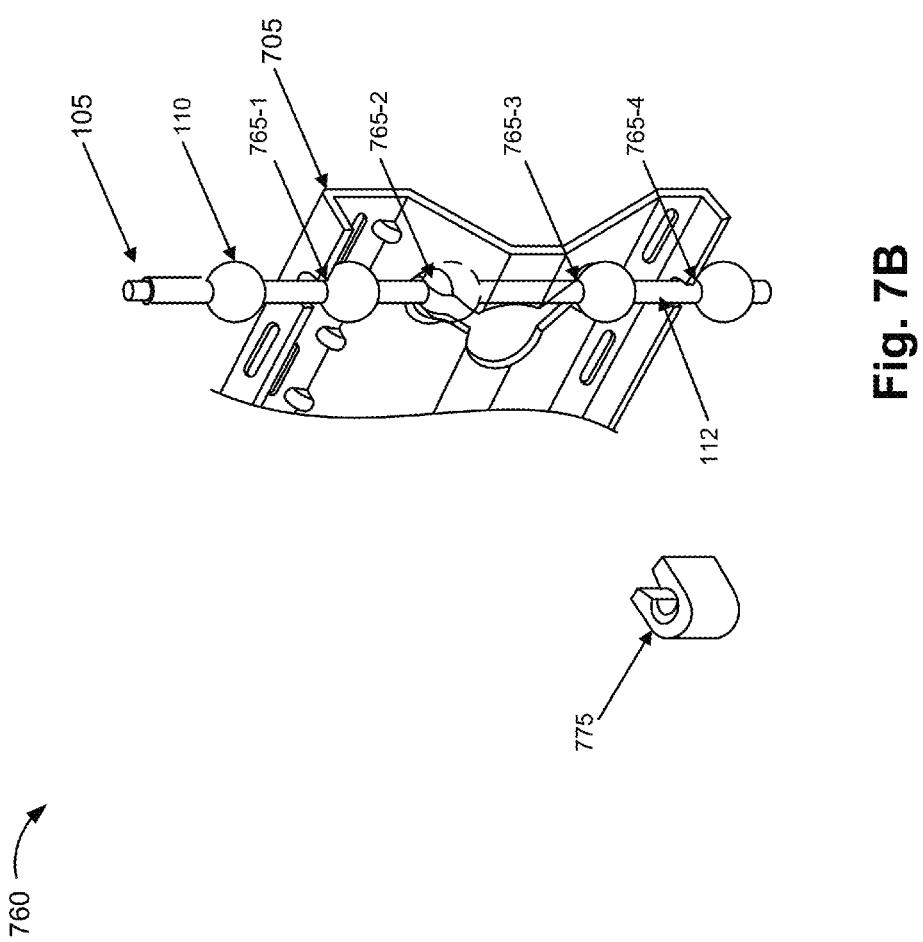

FIG. 7B is a diagram illustrating an isometric view of an exemplary embodiment of an assembly 760. Beaded-rod 105 couples to strut 705 when beaded-rod 105 is inserted into beaded-rod hole 750. As illustrated, beaded-rod 105 suspends strut 705 based on area of contacts 765-1 through 765-4 (also referred to collectively as area of contacts 765 and individually as area of contact 765). Each area of contact 765 includes a portion of strut 705 in contact with bead 110.

Figure 7C:
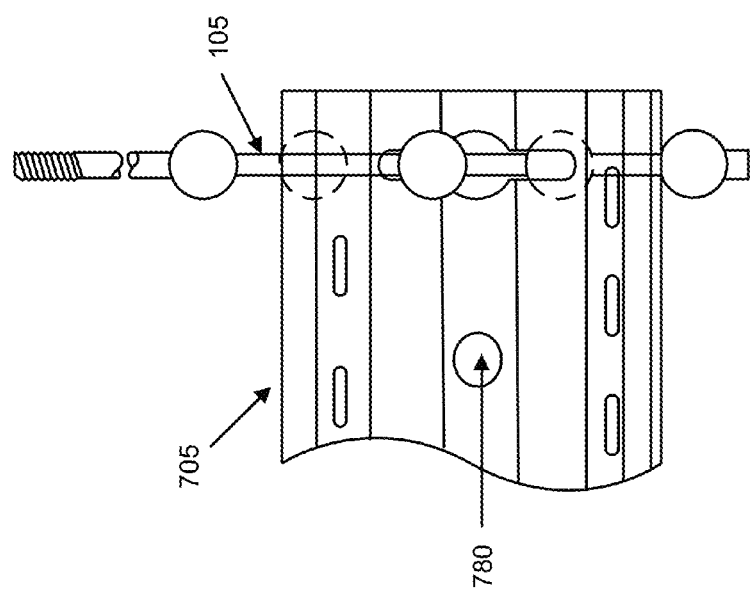
Figure 7D:
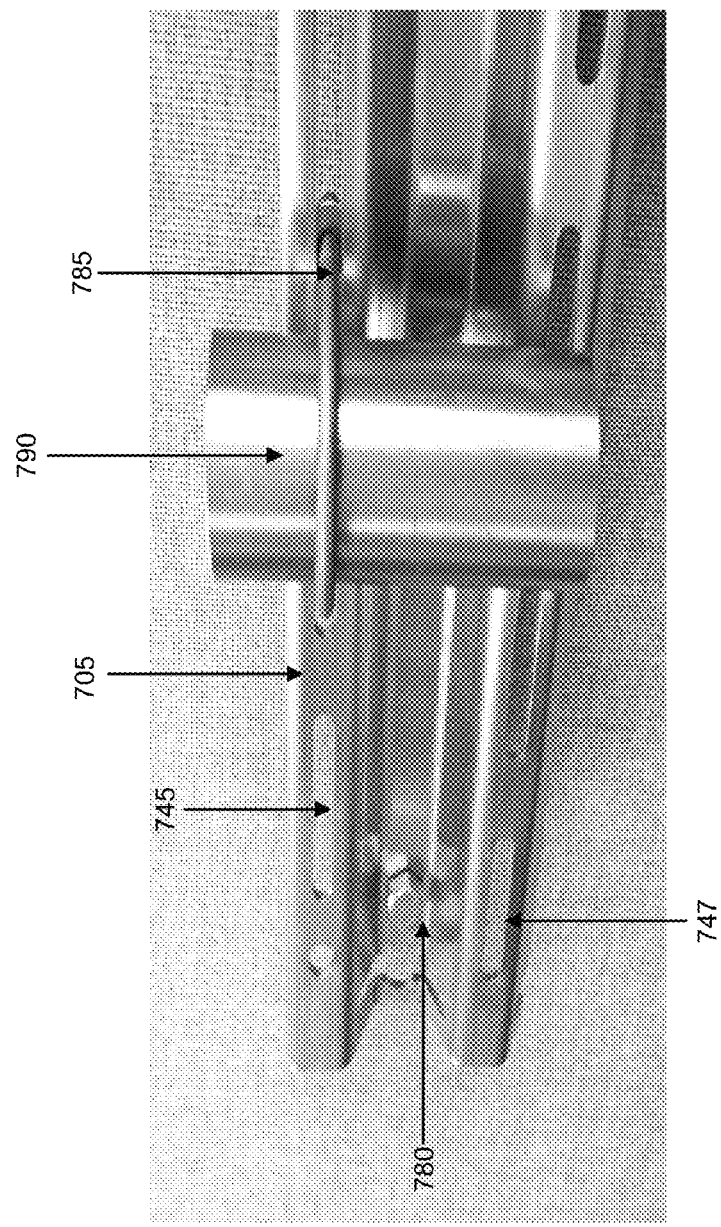

Assembly 760 also includes a locking tab 775. Locking tab 775 is shaped to receive rod 112 of beaded-rod 105. Locking tab 775 assists in securing beaded-rod 105 with strut 705. For example, similar to locking tab 140, locking tab 775 may prevent strut 705 from moving (e.g., upwards). Locking tab 775 may snap around rod 112 located between area of contacts 765-3 and 765-4. FIG. 7C is a diagram illustrating a flattened view of strut 705 and beaded-rod 105. As illustrated, strut 705 includes a hole 780 similar to hole 205 of strut 120. Hole 780 may be used to receive a fastener (e.g., a bolt, a screw, a nail, etc.) to secure strut 705 to a surface. FIG. 7D is a diagram illustrating a perspective view of strut 705 according to a wall-mount case. An attachment 785 (e.g., a U-bolt) secures a fixture 790 (e.g., a pipe) to strut 705 using mounting holes 745.

Figure 8A:
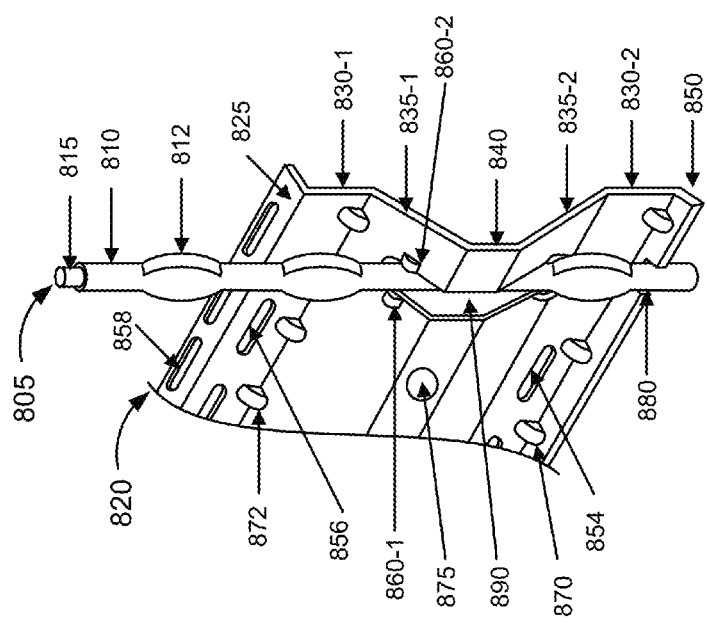
FIGS. 8A-8C are diagrams illustrating views of yet another exemplary embodiment of a mounting assembly.

FIG. 8A is a diagram illustrating an isometric view of a portion of an exemplary embodiment of an assembly 800. As illustrated, assembly 800 includes a flattened beaded-rod 805 and a strut 820. Flattened beaded-rod 805 includes a rod 810, a flattened bead 812, and a threaded portion 815. Similar to beaded-rod 105, flattened beaded-rod 805 may have threading at the other end of flattened beaded-rod 805 to allow a series of flattened beaded-rods 805 to be connected. Flattened beaded-rod 805 may be made from a material previously described for beaded-rod 105.

Strut 820 includes a top wall 825, back walls 830-1 and 830-2 (also referred to collectively as back walls 830 and individually as back wall 830), sloped walls 835-1 and 835-2 (also referred to collectively as sloped walls 835 and individually as sloped wall 835), an intermediate wall 840, and a bottom wall 850. Strut 820 may be made from a material previously described for strut 120. The walls of strut 820 are also similar to strut 120, such as back walls 830 are substantially perpendicular to top wall 825, etc.

Figure 8B:
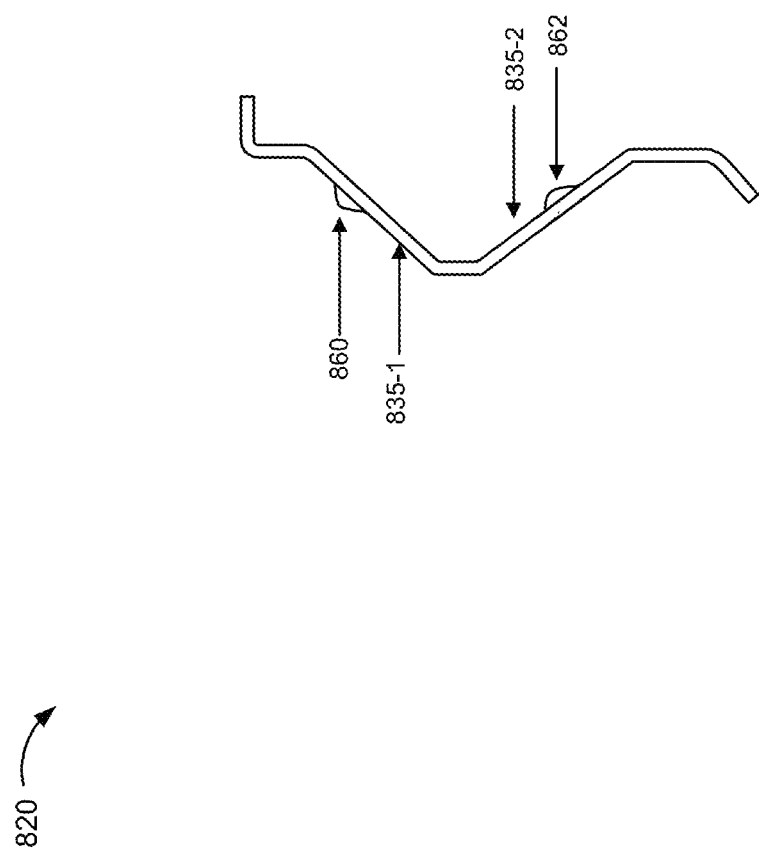

In contrast to strut 120 and strut 705, top wall 825 of strut 820 extends in a somewhat opposite direction than bottom wall 850. Additionally, in contrast to strut 120 and strut 705, strut 820 includes embossments 860-1 and 860-2 (also referred to collectively as embossments 860 and individually as embossment 860). Although not illustrated in FIG. 8A, embossments are similarly situated on an opposite side of sloped wall 835-2. For example, referring to FIG. 8B, strut 820 includes embossments 860 on sloped wall 835-1 and embossments 862 on an opposite side of sloped wall 835-2.

Referring back to FIG. 8A, similar to strut 120, strut 820 includes an array of mounting holes 854 along sloped wall 830-2, an array of mounting holes 856 along back wall 830-1, and an array of mounting holes 858 along top wall 825. Strut 820 includes ribs 870 and ribs 872, a hole 875 for attaching strut 820 to a surface, a rod recess 880, and a flattened beaded-rod hole 890.

Figure 8C:
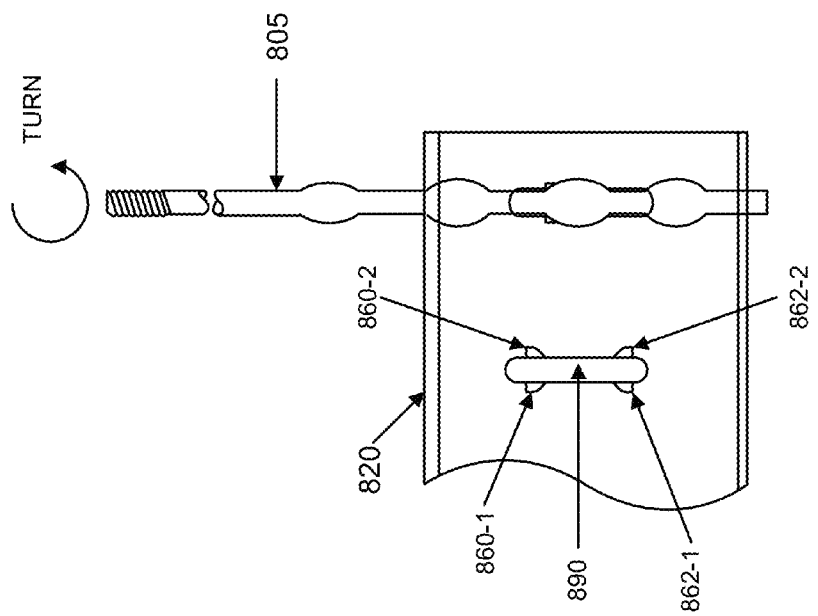

Referring to FIG. 8C, a flattened view of strut 820 includes flattened beaded-rod hole 890 and embossments 860 and 862. In contrast to beaded-rod hole 320/322 that includes a bead hole portion 324 having a shape of bead 110 (as illustrated in FIG. 3D), flattened beaded-rod hole 890 has a uniform shape based on the shape of flattened beads 812 and the method of inserting flattened beaded-rod 805 is inserted in flattened beaded-rod hole 890. For example, to insert flattened beaded-rod 805 into flattened beaded-rod hole 890, flattened beaded-rod 805 is twisted so flattened bead 812 fits into the elongated shape of flattened beaded-rod hole 890. Thereafter, flattened beaded-rod 805 is twisted again (e.g., to a position illustrated in FIG. 8A) so portions of flattened bead 812 rest proximate to embossments 860 and 862.

According to an exemplary embodiment, an assembly includes a strut that is shaped or contoured to minimize or prevent the collection of contaminants. According to an exemplary embodiment, a bottom wall of the strut does not include a lip. According to an exemplary embodiment, the strut includes mounting holes that are offset, as described herein.

According to an exemplary embodiment, the assembly includes beaded rods. The beaded rods are configured to suspend a strut without the use of threaded connections to couple the beaded rods to the strut. For example, the strut may be coupled to the beaded rods without nuts, washers, bolts, fasteners, and the like.

According to an exemplary implementation, beads of the beaded rod are equally spaced. According to an exemplary implementation, the beads are shaped in an oval, an elliptical, or a spherical manner. According to another exemplary implementation, the beads are shaped in an oval-flattened, an elliptical-flattened, or a spherical-flattened manner. According to an exemplary embodiment, the beaded rod includes a threaded portion. For example, the threaded portion may be used to suspend the beaded rod from a surface (a ceiling, etc.) or other system for hanging objects.

The foregoing description of embodiments provides illustration, but is not intended to be exhaustive or to limit the embodiments to the precise form disclosed. Accordingly, modifications to the embodiments described herein may be possible. By way of example, beads 110 may be implemented having shapes other than oval, oval-flattened, etc., such as cubic, rectangular, etc. According to another example, a strut may be modified to include fewer walls. For example, a strut may include a top wall, a back wall, a sloped wall, another back wall, and another sloped wall. According to such a modification, the strut may include a pair of beaded-rod holes. According to another example, for example, referring to FIGS. 6A-6C, a strut may not include holes 205 within intermediate wall 285. Rather, the strut may include holes 205 within both back walls 275. According to yet another example, referring to FIGS. 6A-6C, a strut may be mounted in which the strut is reversed (e.g., horizontally flipped) and attachments and fixtures may be mounted to, for example, the intermediate wall of the strut.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s).

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

What is claimed is:

1. An assembly comprising:
    a strut comprising a first member having a multi-sided profile, one or more of the sides including:
        mounting holes to affix one or more attachments and one or more fixtures to the first member, and
        a set of two or more support holes transversely aligned with respect to the first member to receive and couple a rod, for suspension of the strut from a support structure, wherein each of the support holes is formed in three or more of the sides adjacent to each other; and
    the rod, including:
        at least two bead-like portions spaced apart to fit in the support holes to form a non-threaded coupling, and
        a threaded end portion that connects to another rod via a threaded opening of a bead-like portion located at an end of the other rod.

2. The assembly of claim 1, wherein the multi-sided profile of the strut comprises:
    a first sloped surface;
    a first vertical surface that extends from the first sloped surface; and
    a bottom surface that extends from the first vertical surface, and wherein the bottom surface is sloped in relation to the first vertical surface, wherein a first one of the set of support holes is defined within the first sloped surface, the first vertical surface, and the bottom surface.

3. The assembly of claim 2, wherein the multi-sided profile of the strut further comprises:
    a top surface;
    a second vertical surface that extends from the top surface; and
    a second sloped surface that extends from the second vertical surface to an intermediary surface that extends to the first sloped surface, and wherein a second one of the set of support holes is defined within the top surface, the second vertical surface, and the second sloped surface.

4. The assembly of claim 1, wherein the at least two bead-like portions are equally spaced apart on the rod.

5. The assembly of claim 1, wherein the multi-sided profile of the strut comprises:
    a first vertical surface that includes a first set of the mounting holes, wherein the first set of the mounting holes are equally spaced apart along a portion of the first member; and
    a second vertical surface that includes a second set of the mounting holes, wherein the second set of the mounting holes are equally spaced apart along the portion of the first member, and wherein the first set of the mounting holes are offset relative to the second set of the mounting holes along the portion of the first member.

6. The assembly of claim 1, further comprising:
    one or more locking tabs that secure the rod to the first member of the strut.

7. The assembly of claim 1, wherein the multi-sided profile of the strut comprises:
    a top surface that includes one or more recesses to receive a first portion of the rod; and a bottom surface that includes one or more recesses to receive a second portion of the rod.

8. The assembly of claim 1, wherein the non-threaded coupling comprises at least four areas of contact between portions of the rod and portions of the first member.

9. An assembly comprising:
a set of rods, each rod including a series of bead-like portions spaced apart along a length of the rod between opposite ends of the rod including a threaded end and a bead-like end having a threaded opening for coupling of the rods; and
a strut comprising a first member having a multi-sided profile, one or more of the sides including:
mounting holes to affix one or more attachments and one or more fixtures to the first member, and
a set of two or more support holes transversely aligned within the first member to receive and couple one of the rods perpendicularly with the strut for suspension of the strut from a support, wherein each of the support holes is defined in three or more of the sides adjacent to each other, and spaced apart to correspond to a spacing of the series of bead-like portions of the rod for forming a non-threaded coupling.

10. The assembly of claim 9, wherein the multi-sided profile of the strut comprises:
a first sloped section having a first slope;
a second sloped section having a second slope that is oppositely sloped relative to the first slope; and
an intermediate section that extends from the first sloped section to the second sloped section, and wherein a first one of the support holes extends from the first sloped section to the intermediate section and to the second sloped section.

11. The assembly of claim 9, wherein the non-threaded coupling comprises at least four areas of contact between portions of the rod and portions of the first member.

12. The assembly of claim 9, wherein the multi-sided profile of the strut comprises:
a top section,
a first vertical section extending substantially perpendicularly from the top section;
a first sloped section extending from the first vertical section;
an intermediate section extending from the first sloped section and substantially perpendicular to the top section;
a second sloped section extending from the intermediate and substantially oppositely sloped relative to the first sloped section;
a second vertical section extending from the second sloped section and substantially coplanar with the first vertical section; and
a bottom section that extends from the second vertical section, wherein the bottom section is sloped in relation to the second vertical section.

13. The assembly of claim 12, wherein each of the support holes is proximate to an end of the first member, and wherein a first one of the set of support holes extends from the top to the first vertical section and to the first sloped section, and wherein a second one of the set of support holes extends from the second sloped section to the second vertical section to the bottom section.

14. The assembly of claim 12, wherein a first set of mounting holes is defined within the top section, a second set of mounting holes is defined within the first vertical section, and a third set of mounting holes is defined within the second vertical section.

15. An assembly comprising:
a strut comprising a first member having a multi-sided profile, including:
a top section,
a first vertical section extending substantially perpendicularly from the top section;
a first sloped section extending from the first vertical section;
an intermediate section extending from the first sloped section and substantially perpendicular to the top section;
a second sloped section extending from the intermediate and substantially oppositely sloped relative to the first sloped section;
a second vertical section extending from the second sloped section and substantially perpendicular to the top section and coplanar with the first vertical section, wherein the intermediate section is parallel to but not coplanar with each of the first vertical section and the second vertical section;
a bottom section that extends from the second vertical section, wherein the bottom section is sloped in relation to the second vertical section;
a set of support holes transversely aligned with respect to the first member to receive and couple to a rod for suspension of the strut from a support structure, wherein a first support hole is formed through each of the top section, the first vertical section, and the first sloped section, and wherein a second support hole is formed through each of the second sloped section, the second vertical section, and the bottom section; and
the rod, wherein the rod includes bead-like portions spaced apart to fit in the first and second support holes to form a non-threaded coupling.

16. The assembly of claim 15, wherein the first sloped section, the second sloped section, and the bottom section have substantially a same amount of sloping.

17. The assembly of claim 16, wherein the same amount of sloping is between thirty degrees and sixty degrees.

18. The assembly claim 15, wherein the first vertical section includes a first set of mounting holes, wherein the first set of the mounting holes are equally spaced apart along a portion of the first member; and
the second vertical section includes a second set of mounting holes, wherein the second set of the mounting holes are equally spaced apart along the portion of the first member, and offset to the first set of mounting holes of the first vertical section.

* * * * *